(12) United States Patent
Houston et al.

(10) Patent No.: US 7,098,907 B2
(45) Date of Patent: Aug. 29, 2006

(54) METHOD FOR CONVERTING EXPLICITLY REPRESENTED GEOMETRIC SURFACES INTO ACCURATE LEVEL SETS

(75) Inventors: Benjamin B. Houston, Winnipeg (CA); Mark Wiebe, Winnipeg (CA)

(73) Assignee: Frantic Films Corporation, Winnipeg (CA)

( * ) Notice: Subject to any disclaimer, the term of this patent is extended or adjusted under 35 U.S.C. 154(b) by 337 days.

(21) Appl. No.: 10/767,856

(22) Filed: Jan. 30, 2004

(65) Prior Publication Data

US 2005/0128195 A1    Jun. 16, 2005

Related U.S. Application Data

(60) Provisional application No. 60/443,543, filed on Jan. 30, 2003.

(51) Int. Cl.
*G06T 15/00* (2006.01)
(52) U.S. Cl. .................... 345/419; 600/407; 378/22
(58) Field of Classification Search ........ 345/419–422, 345/426; 378/21–27, 46–47; 600/410–412, 600/406–407
See application file for complete search history.

(56) References Cited

U.S. PATENT DOCUMENTS

| 6,532,017 B1* | 3/2003 | Knittel et al. ............... 345/506 |
| 6,704,694 B1* | 3/2004 | Basdogan et al. ............. 703/4 |
| 6,982,710 B1* | 1/2006 | Salomie ..................... 345/420 |

OTHER PUBLICATIONS

Peter et al., Analytical versus Voxelized Phantom Representation for Monte Carlo Simulation in Radiological Imaging, Medical Imaging, IEEE, vol. 19, issue 5, May 2000; pp. 556-564.*

* cited by examiner

*Primary Examiner*—Phu K. Nguyen
(74) *Attorney, Agent, or Firm*—Ryan W. Dupuis; Michael R. Williams; Adrian D. Battison

(57) ABSTRACT

An explicit definition of a geometric object is converted into a level set which implicitly defines the geometric object. The explicit definition is converted to a form for efficient ray casting. Magnitude and sign values are assigned to a grid of voxels using ray casting in which the magnitude value represent a minimum distance from the voxel to the object and the sign value defines whether the voxel is inside or outside the object. The magnitude and sign values may be removed of discontinuities and smoothed before an accurate level set implicitly defining the object is achieved. Run length encoding may be applied to define a sparse level set in which consecutive voxels having identical values are compressed into a single value including a marker to indicate a quantity of the consecutive voxels.

21 Claims, 4 Drawing Sheets

C-Run Signed Distances : Initial

| +∞ | +∞ | +∞ | +∞ | +∞ | +∞ | +∞ | +∞ | +∞ | +∞ | +∞ | +∞ |
|---|---|---|---|---|---|---|---|---|---|---|---|
| 1 | 2 | 3 | 4 | 5 | 6 | 7 | 8 | 9 | 10 | 11 | 12 |

Ray Tracing Pass 1

C-Run Signed Distances : After Ray Tracing Pass 1

| 4.3 | 3.3 | 2.3 | 1.3 | 0.3 | -3.8 | -2.8 | -1.8 | -0.8 | +∞ | +∞ | +∞ |
|---|---|---|---|---|---|---|---|---|---|---|---|
| 1 | 2 | 3 | 4 | 5 | 6 | 7 | 8 | 9 | 10 | 11 | 12 |

Ray Tracing Pass 2

C-Run Signed Distances : After Ray Tracing Pass 2

| 4.3 | 3.3 | 2.3 | 1.3 | 0.3 | -0.7 | -1.7 | -1.8 | -0.8 | 0.2 | 1.2 | 2.2 |
|---|---|---|---|---|---|---|---|---|---|---|---|
| 1 | 2 | 3 | 4 | 5 | 6 | 7 | 8 | 9 | 10 | 11 | 12 |

--- The discontinuity Sign is negative

--- The original surface

METHOD FOR CONVERTING EXPLICITLY REPRESENTED GEOMETRIC SURFACES INTO ACCURATE LEVEL SETS

FIELD OF THE INVENTION

This application claims priority under 35 U.S.C. Section 119(e) to Provisional Patent Application No. 60/443,543 filed on Jan. 30, 2003. The present invention relates to level set methods for implicit surfaces, and more particularly relates to a method for converting an explicit definition of a geometric object into a level set which implicitly defines the geometric object.

BACKGROUND

The broad context of this invention is in bridging the gap between implicit and explicit representations of surfaces. Explicit representations are most commonly used in Computer Graphics, because they are convenient for rendering and easily controlled by artists. They are defined by explicitly specifying where the surfaces lie, such as via parametric functions mapping a 2D domain onto a 3D surface. Implicit surfaces have advantages in contexts where surface topology changes rapidly and when it is desirable for nearby objects to merge in a soft way rather than with a hard cracks at the intersections. They are specified as the root of a scalar function defined over 3D space.

Level sets are a very useful representation of forms commonly used in a quickly developing sub-field of computational fluid dynamics. In addition to having the obvious scientific and engineering applications, these simulations have significant potential for simulating fluid phenomena such as water, smoke, mist and fire at resolutions sufficient for use in the computer graphics industry. Moving from a significant amount of hand animation and noise maps towards physically based simulations has the potential for creating increasingly realistic Computer Graphics and animations.

Form Representations used in Computer Graphics

There are many ways of explicitly representing geometric objects. Polygons, NURBS, and Subdivision Surfaces are commonly used in the graphics industry. It is common for objects modeled as these primitives to have imperfections such that they do not represent a perfectly enclosed volume with a well defined inside and outside. There may be holes or cracks in the surface, and the normals may be pointing in the wrong direction on parts of the surface. In order for the method of the present invention to be useful in practice, it should be able to produce a high quality level set representation of the surface from most commonly used explicit geometric models.

Explicit Representations

A detailed description of techniques for using these geometric object representations can be found in most modern comprehensive graphics textbooks such as (Watt A. & Watt, M. 1996).

Ray Trace Operator

There are many different representations one could use for efficient ray tracing of a geometry model. We give a description of how a BSP tree can be used for this purpose. Other alternative representations that met the necessary requirements of efficient ray tracing can be found in a modern computer graphics textbook such as (Watt A. & Watt, M. 1996). For example, a nested hierarchy of bounding boxes can be used to efficiently ray trace a NURBS surface set, and a combination of techniques might be combined to handle significantly varied and complex geometry.

Binary Space Partition Tree

A BSP tree is a method of representing a set of planar polygons such that the process of "ray casting" is efficient. It is a, preferably balanced, binary tree data structure in which each node is associated with a plane and a set of polygons that lie within that plane.

A BSP tree can be created in a recursive fashion from the root node on down to its leaves by applying this procedure for each node:

Choose a plane that is coplanar with one of the polygons in the face set. It is best to pick a plane that will "split" the face set evenly (see the next step) as such will allow for more efficient BSP tree traversals during "ray casting."

Sort the set of faces into three new set: "in front", "coplanar" and "behind." A face whose vertices all lie within the chosen plane of the node will be placed in the "coplanar" set. A face whose vertices are all in front of the plane will be placed in the "in front" set. And a face whose vertices all lie behind the plane will be placed in the "behind" set. A face who's vertices lie both in front and behind the plane should be split into two faces, one who's vertices are completely in front of the plane and another who's vertices are completely behind the plane—these two newly created faces should then be placed into the "in front" set and the "behind" set respectively.

The "coplanar" set of faces is then associated with the current node. If the "in front" set of faces is not empty a "left-hand" child node should be created using the "in front" set as a starting point. The same logical also applies to the "behind" set and the "right-hand" child node.

Level Set

A comprehensive description of what is a level set and what can be done with one is given in the well-written textbook (Osher, S. & Fedkiw R. 2003.)

A level set is an n-dimensional scalar field which implicitly represents the interface between two regions in a domain. It represents such an interface as the zero-contour of the scalar field. A scalar field is defined mathematically by a function, $\phi(x)$, which associates a scalar value with each point in space. The zero contour of a scalar field (i.e. the interface represented by the level set), $\lceil$, is the set of points in the domain whose image from applying $\phi$ is 0.

For the most part only 3D level sets are of real concern to us—although this method applies equally well in both 2D cases and in higher dimensional applications.

A level set also has the property that it is a signed distance field. This means that the magnitude of the scalar field at any point in the domain is the distance between that point and the nearest point on the interface. The sign of the scalar field function determines whether one is inside one region or the other—which sign denotes which region is arbitrary based on the chosen convention. The convention used in this document is for the interior of forms to have a positive sign.

Because of the limitations imposed by a finite computing architecture it is impossible to truly represent an arbitrary continuous scalar field over any unbounded domain. It is possible though to restrict the domain over which the scalar field is defined to a sub domain and then discretize the scalar field function within this sub domain into "voxels" of identical size within which the function result does not vary. For simplicity sake it is often convenient to restrict the sub domain to a quadrilateral (i.e. a 3D box.). FIG. 2 diagrams the voxel fields and associated terminology.

Each voxel of the discretized level set can now be represented by a single scalar. Conceptually the scalar associated with each voxel can be thought of as lying at its center. It is also not incorrect to view the scalars forming a uniform Cartesian grid over the sub domain of the now discretized level set.

Equation 1: Discretized Level Set $$\phi(\vec{x}) = \begin{cases} \phi_{u,U} = T_{w=>r}(\vec{x}) & \text{if } \vec{x} \in \Omega \\ \text{undefined} & \text{otherwise} \end{cases}$$

Equation 2: world-to-discrete transform $$T_{u=>w}(\vec{x})$$

$$u_x = \left[\frac{x_x - w_x}{\Delta c}\right]$$

$$u_y = \left[\frac{x_y - w_y}{\Delta c}\right]$$

$$u_z = \left[\frac{x_z - w_z}{\Delta c}\right]$$

Equation 3: discrete-to-world transform $$T_{u \to w}(\overline{x})$$

$$x_x = w_x + u_x \Delta c$$

$$x_y = w_y + u_y \Delta c$$

$$x_z = w_z + u_z \Delta c$$

A minimalist level set data structure could consist simply of:
1. A vector represent the minimum extent of the level set's defined region of validity, w[min].
2. The dimensions of the level set in cubes/voxels: w, h, d
3. The side length of the cubes: $\Delta c$
4. The set of scalar values, each associated with a particle voxel of the level set: $\psi(u)$ $$\psi_u \in \Re, u \in \Im$$

Equation 4: definition of $\psi$ $$T_{r \to i}(u)$$

$$i = u_x + u_y \cdot w + u_z \cdot w \cdot h$$

Equation 5: Discrete-to-$\psi$-index transformation

Existing Mesh to Level Set Methods

There are three general approaches common in the literature for converting explicit surface representations into volumetric distance field representations: closest point, narrow band initialization with Eikonal extension, and full volume rasterization.

Closest point approaches to conversion tend to iterate over all or a subset of the voxels in a volume instead of iterating over the surfaces of the input mesh. Examples include [Payne and Toga 1992]. For each voxel the closest point on the explicit representation is calculated and the distance along with the relative direction of the surface normal at this location is used to set the voxel value. The more efficient closest point algorithms areO(logF). If one initializes the whole volume using this approach the efficiency is $O(n^3 \log F)$. Narrow band initialization methods of converting meshes into level set focus on initializing the band of voxels immediate adjacent to the surface of the mesh to their correct values and then using this interface as the boundary condition of an Eikonal equation solver such that the solution can be extended throughout the volume (as described in [Sethian 1996]). One method to initialize the narrow band is through the 3D rasterization of the polygons composing the mesh in an analogous manner to how 2D polygons are rendered to a frame buffer. Sometimes the 3D rasterization is done such that the initial narrow band is initialized to subvoxel distance values, These approaches generally require $O(F+n^3)$ computations. [Breen et al. 1998], [Betelu et al. 2001].

Recently a full volume rasterization method, [Mauch 2000], has achieved xcellent efficiency, $O(n^3)$, by using polyhedral volumes extended from the input mesh surfaces to initialize into a correct distance field via rasterization large sections of the volume at once. The research with the most similarity to ours is work done by [Yngve and Turk 2002]. Yngve and Turk make use of a process of axis aligned ray casting in order to convert a mesh into an anti-aliased binary volume which in turn is converted into a signed distance field via a 3D Eikonal solver. The whole of this conversion process requires $O(n^3+n^2 \log f)$ computations assuming the fastest method are used.

SUMMARY

According to one aspect of the present invention there is provided a method of converting an explicit definition of a geometric object located in a prescribed space to a level set which implicitly defines said geometric object, the method comprising:

dividing the prescribed space into a grid of voxels, each voxel comprising a unit of the prescribed space;

casting rays in plural directions to obtain plural distance votes associated with each voxel in which each distance vote represents a distance from the voxel, through the prescribed space, to the geometric object in one of said plural directions of the rays;

assigning a magnitude value to each voxel by selecting the distance vote associated with that voxel which is lowest in magnitude;

determining if each voxel is either inside or outside of the geometric object in the prescribed space; and assigning a sign value to each voxel, the sign value being either a positive sign or a negative sign in which each of the signs is representative of a sign condition of the voxel being either inside or outside of the geometric object.

Determining if each voxel is either inside or outside of the geometric object may be accomplished by associating a sign vote with each distance vote associated with the voxel in which each sign vote is either a positive sign or a negative sign representative of the sign condition as determined by casting the rays, wherein the sign value is assigned a sign which is a majority sign of the sign votes associated with that voxel.

When the explicit definition of the object includes normal vectors defined which project in a perpendicularly outward direction from a surface of the object, the method preferably includes determining the sign votes representing the voxel being either inside or outside of the object by comparison to the normal vectors of the surface of the object.

The method preferably further includes either consistently assigning a positive sign or consistently assigning a negative sign to the sign value when sign votes of positive sign and sign votes of negative sign for a given voxel are equal in number.

The rays may be cast along three or more axes of each voxel which are lying transversely to one another, but preferably are cast along multiple axes of the grid of the voxels. Accordingly rays may be cast in directions which intersect a plurality of voxels.

The method may include interpolating distance votes of voxels between a selected voxel having a distance vote which has already been assigned and the object in a first direction along an axis of the ray which was cast for assigning the distance vote to said selected voxel and subsequently interpolating distance votes in a second direction along said axis by casting rays in an opposite direction.

Comparing the magnitude values of adjacent voxels adjacent to the implicitly defined object in the grid of voxels and adjusting the magnitude values such that adjacent ones of the magnitude values differ by approximately a magnitude of a dimension of the voxels and such that a surface of the implicitly defined object remains in a same position with the grid of voxels.

The method may further include applying a level set smoothing algorithm to the voxel magnitude values which implicitly define the geometric object.

When a bounding box is defined in the prescribed space which contains the object; rays are preferably only cast from voxels which are contained within the bounding box.

When a bounding box is defined in the prescribed space which intersect the object, the explicit definition of the object is clipped against the bounding box of the domain of the implicitly defined object.

The explicit definition of the geometric object may comprise a polygonal mesh, a NURBS surface, or a subdivision surface.

Prior to casting the rays, a representation of the explicit definition of the geometric object is preferably generated which allows for efficient ray casting, for example a BSP tree.

Run length encoding may be applied to define a sparse level set in which consecutive voxels having identical values are compressed into a single value including a marker to indicate a quantity of the consecutive voxels. Once rays are cast along a first axis using the run length encoding with the runs explicitly defined, subsequently rays cast along second and third axes transverse to the first axis are preferably accomplished such that the values of the voxels are extracted from the run length encoding from the rays previously cast in a different direction using a one dimension Eikonal equation solved to estimate the magnitude values within predefined interface boundaries.

The method may further include creating extra data structures and a different method of out-of-order traversal of the run length encoded signed distance data is performed to initialize the level set data in preparation for ray casting along a new axis by:

performing $n^2$ concurrent in-order traversals perpendicular to the axis along which a current line cross-section lies;

encoding the line cross-section using an additional run length encoded sparse line encoding by adding all the current perpendicular runs to a priority queue which orders them by the location on their axis of compression at which the runs terminate;

querying a priority queue to find out if there are any runs that change at this location in the previous axis of compression; and sorting runs if said runs change their type from containing uncompressed data to compressed data so that one can linearly traverse the previous run length encoded sparse line encoding and encode the new run length encoded sparse line encoding by examining the runs which are changing.

According to a further aspect of the present invention there is provided a process for converting explicit surfaces, such as polygonal meshes or NURBS, into accurate level set representations, even in the presence of imperfections such as overlapping surfaces or non-closed interior regions, via the following sequential steps:

The explicit surface is converted into a representation that allows for efficient ray tracing. For polygonal meshes such a representation could be a binary space partition tree (a representation known to those familiar with the computer graphics literature). Standard techniques exist for all of the common explicit surface types. The only requirement of such a representation is that it allows for rays to be cast at the surfaces of the source model in a computationally efficient manner.

Rays are then cast from the center of each voxel of the desired output level set. The directions in which the rays are cast are not uniquely specified although a uniform distribution of directions in 3D space is desirable. A simple and usable set of possible ray casting directions would be along the x, y and z-axis of the local coordinate space in both the positive and the negative directions. The result of each ray cast, the distance to the "hit" and the sign of the dot product between the ray direction and the surface of the "hit", are then recorded and associated with the voxel center where the ray originated. The results of the ray cast are, in the context of this invention, referred to as the "distance votes" and "sign votes" respectively and are stored with the voxel from which the rays originated. Rays which do not "hit" any surfaces of the source form cast a "distance vote" of infinity and a sign vote of "negative"—although for other applications other default votes might be desirable. Conceptually a "negative vote" is a vote for that voxel to be a member of one region, the inside of the form, while a "positive vote" is a vote for that voxel to be a member of the other region, the region outside of the form.

The preliminary output level set is constructed by analyzing the votes recorded during the ray casting step. For each voxel center of the desired level set the scalar field function result's magnitude and sign are calculated separately. The magnitude of the scalar field function result is set to the minimum absolute distance of the "distance votes" associated with the particular voxel. The sign of the scalar field function result is set to the winning sign as determined by counting of the "sign votes" associated with the voxel. If there is a tie between the positive and the negative votes after counting the "sign votes" the choice of winner is application dependent. In our applications of the invention we found that is was desirable for the sign indicating the inside of the form to win in the case of a tie.

In some situations the preliminary level set generated after analyzing the votes contains some discontinuities: regions in which the gradient of the level set is much larger than the desired magnitude of 1. Discontinuities that are not directly adjacent to the zero-level set can be fixed via the "smoothing" process outlined in section 1.e of this summary. Discontinuities directly adjacent to the zero-level set must be fixed via another means. This can be accomplished by examining each pair of adjacent voxels. If the pair differ in sign (i.e. both are directly adjacent to the zero-level set) and the difference between their respective scalar field function values is significantly larger than the distance in space between the voxel centers, the scalar field function results should be reset to values that differ by only the distance between the voxel centers and that do not modify the location of the zero-level set intercept between them. This dual requirement is achieved via first constructing the equation of a line represented by the scalar field function values between the two voxels and noting its zero-intercept. The slope of the line is then adjusted such that its magnitude is 1 while keeping its sign constant. From the zero-intersection and the new slope both of the scalar field functions are uniquely determined. A more complex method of doing this is also possible which takes into account the effect that multiple dimensions have on maintaining the locations of the zero-level set.

The preliminary level set, from which the zero-level set adjacent discontinuities, where removed, is then processed by a level-set "smoothing" method (also referred to as a level set "reinitialization" method). Many such methods are detailed in the level set methods literature. These "smoothing" methods in general process the values of the level set such that the gradient away from the zero-level set becomes approximately one. One method used extensively is based on solving to a steady state in fictitious time the following PDE (Sethian, J. A. 1999):

$$\phi_\eta = -S(\phi^{\eta=0})(|\nabla \phi| - 1)$$

$$S(\phi) = \frac{\phi}{\sqrt{\phi^2 + \Delta \tau^2}}$$

A modification of the process described above may be done, such that the rays cast during the ray tracing step are aligned such that they are coincident with multiple voxel centers. This allows for a significant reduction in the computations required because on result of a single ray cast can be used to determine the votes for a number of voxel centers at once.

The same process as described above may be performed, except that instead of ray tracing from/along the centers of all the voxels in the desired level set, rays are only cast from/along voxels which are in a bounding region of the form (i.e. a bounding box). The voxel values in the remaining region outside of the form bounding region of the level set can then be set approximately via a Gauss-Seidel iterative sweep method. Such methods are detailed in the level set method literature. When a form only partially overlaps the region of the desired level set this claim may significantly speed up the ray-tracing step.

The same process as described above may be performed, except that the form representation is clipped against the bounding region of the desired level set before it is converted into a representation that allows for efficient ray tracing. This can significantly reduce the complexity inherent in both the creation of the ray tracing representation and the casting of rays through that representation. When a form only partially overlaps the region of the desired level set this claim may significantly speed up the conversion of the form into an efficient ray-traceable representation.

The same process as described above may be performed in which the final "smoothing" stage is omitted. In some situations in which a number of level set are being combined it is not necessary to ensure that each one is smooth before the combination—only one "final" smoothing of the resulting combined level set is necessary. In such situations applying the somewhat computationally costly "smoothing" to each component level set separately would be wasteful and time consuming while yielding no benefit.

The same process as described above may be performed in which the source form representation is optimized before it is converted into a representation that allows for efficient ray tracing. Such an "optimization" procedure would remove minor detail components of the form while maintaining the major details of the object. Such optimization procedures are standard tools in most 3D computer graphics editing packages—usually referred to as simply an operation called "optimize" which can be applied selectively to forms. This would reduce the complexity of the ray tracing representation which both make it less computationally costly to generate from the source form representation and less computationally expensive for rays to be cast through it.

The same process as described as described above may be performed in which the ray casting is performed on a RLE sparse level set. Each voxel line is run length encoded to reduce space requirements. When a new dimension of ray casting is started after the first one, the initial data is populated for a voxel line from ray casts in the previous directions. A one dimensional Eikonal equation is solved for the voxel line within an arbitrary interface distance to improve the accuracy of the level set, and to clearly demarcate the interface of the run that contains interface data.

The same process as described above may be performed, in which extra data structures are created and a different method using out-of-order traversal of the run length encoded signed distance data is performed to initialize the level set data in preparation for ray casting along a new axis. This is comprised of the following steps:

Perform $n^2$ concurrent in-order traversals. The in-order traversals are perpendicular to the axis along which the current line cross-section lies.

Encode the line cross-section using an additional RLE sparse line encoding. Add all the current perpendicular runs to a priority queue which orders them by the location on their axis of compression at which the runs terminate.

Query the priority queue to find out if there are any runs that change at this location in the previous axis of compression.

If there are runs which change their type from containing uncompressed data to compressed data, then these runs are sorted so that one can linearly traverse the previous RLE sparse line encoding and encode the new RLE sparse line encoding by examining the runs which are changing.

BRIEF DESCRIPTION OF THE DRAWINGS

In the accompanying drawings, which illustrate an exemplary embodiment of the present invention.

DETAILED DESCRIPTION

The present invention uses a number of established techniques as its foundation, including accelerated raytracing and level set methods. The method uses a version of the explicit geometry suitable for raytracing to generate an initial crude version of the level set, then applies a number of continuity fixes to minimize effects of imperfect geometry, as well as smoothing to give a high quality output.

The output of this invention, the level set, has many advantages. In the case of computational fluid dynamics, it provides a representation of objects which closely match the grids in which the fluid simulations are done. This makes many processes which combine geometric objects and fluid more efficient and elegant. The considerable amount of literature which has been produced on level set techniques and their uses provide many other examples.

This invention achieves its results via a five step sequential process.

Step 1: Creation of Efficient Ray Tracing Representation

The explicit surface is converted into a representation that allows for efficient ray tracing. For polygonal meshes such a representation could be a BSP tree, but any of the many raytracing acceleration techniques can be used, Step 2: Ray Casting In order to recover an accurate distance function from the explicitly represented object, we must determine the nearest distance to the surface from each voxel center, as well as whether the point is inside or outside the object. Consider a single point on the grid of the desired level set. Conceptually, one can imagine an expanding spherical balloon centered at this point. At some point, a part of the balloon would bump into part of the surface, and no longer be able to expand. The radius of the sphere at this moment is the required distance, with an appropriate sign depending on whether the point is inside or outside the object.

This idealization is approximated by taking a number of samples from the voxel center. By casting rays originating from this point, and choosing the minimum sampled distance, we obtain a value for the level set. Explicit surfaces are usually modeled with their normals pointing outwards, so the normal of the intersection of the closest sample can be used to determine whether the point is inside the object.

Figure 1:
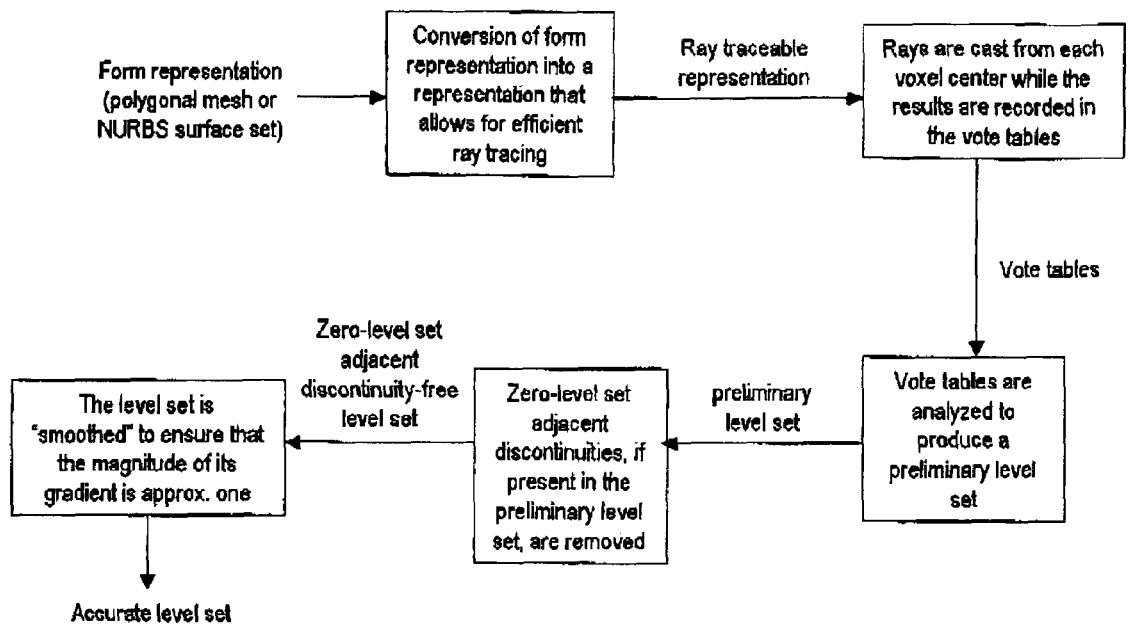
FIG. 1 is an overview of the steps of the invention process.
Figure 2:
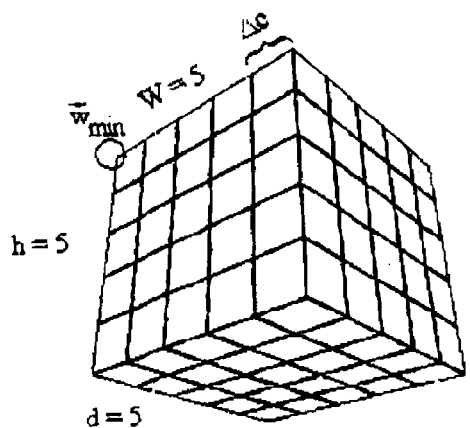
FIG. 2 is a definition of terms on the discrete level set.
Figure 3:
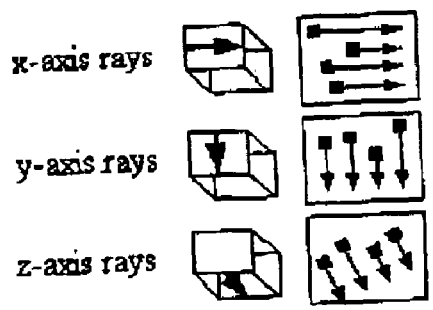
FIG. 3 is a basic x, y, and z-axis aligned ray casting directions.
Figure 4:
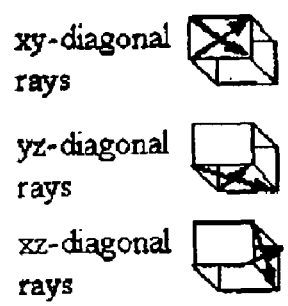
FIG. 4 is an optional planar diagonal ray casting directions.
Figure 5:
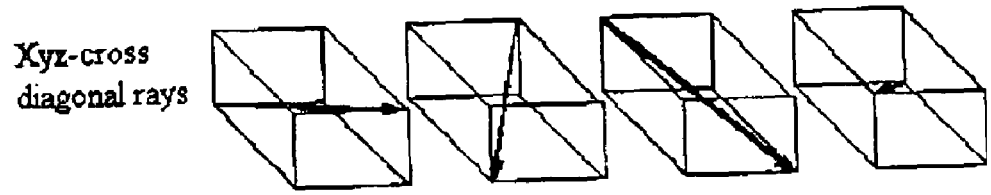
FIG. 5 is an optional cross-diagonal ray casting directions.

A simple set of possible ray casting directions would be along the x, y and z axis of the local coordinate space in both the positive and the negative directions. The diagrams in FIG. 3, FIG. 4, and FIG. 5 diagram this process.

These are of course not the only possibilities. A uniformly generated quasi-monte cado sample could be used as well, and would replace the more regular axis-aligned errors of the above approach with random variance.

Imperfect Geometry

Depending on the tools used to model the geometric objects, the resulting explicit representations may have imperfections that prevent the described method from working. These imperfections can take a number of forms, including holes or cracks in the geometry and inverted normals.

In modelling geometry for the purposes of rendering, these imperfections can often be ignored. The cracks are often hidden behind other surfaces, and it is sometimes feasible to render the geometry as "two-sided," in which case the direction the normals face is unimportant. Because of this, modelling tools often do not have the facilities required to easily build geometry without imperfections, and a considerable amount of effort would be required to improve such a model to the acceptable level.

If not carefully accounted for, these imperfections will manifest themselves in the resulting level set through a number of defects. A gap in the surface can result in a hole or bulge in the implicit object, depending on how the samples are chosen. The distance function will be inaccurate near the gap, with a discontinuity where the resulting surface fills the gap.

If a portion of the geometry has normals facing the wrong way, the sign of the produced distance function will be incorrect in the neighboring region. This will result in a hole inside the object and a bulge outside, with large discontinuous jumps where the inverted normals lose influence.

Step 3: Ray Casting with Votes

We augment the ray casting technique described above in a way to minimize the damage done by the imperfections in the input explicit geometry. The result of each ray cast, the distance to the "hit" and the sign of the dot product between the ray direction and the surface of the "hit" (determining whether it is inside or outside), are recorded and associated with the voxel center from which the ray originated. The results of the ray cast are, in the context of this invention, referred to as "distance votes" and "sign votes" respectively of this voxel.

The majority vote determines whether the voxel center is inside or outside of the object, and a consistent method is chosen to break ties. If none of the rays hit a surface, the voxel center is outside, and a reasonably estimated large enough distance is used. Ties can be broken in a number of ways, but a consistent strategy for breaking them must be chosen. We have found that putting voxel centers which are tied inside of the object works well in practice. Alternatives. such as casting more samples, are also feasible and would produce satisfactory results.

Optimized Ray Casting

Figure 6:
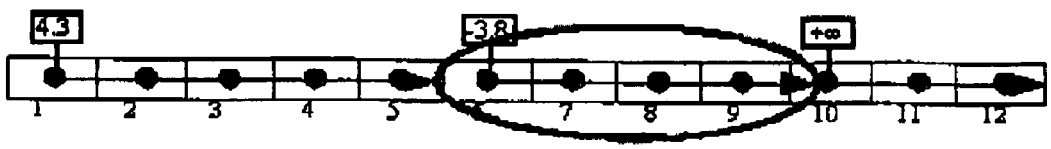
FIG. 6 is a ray marching iterations with corresponding cast votes.
Figure 6:
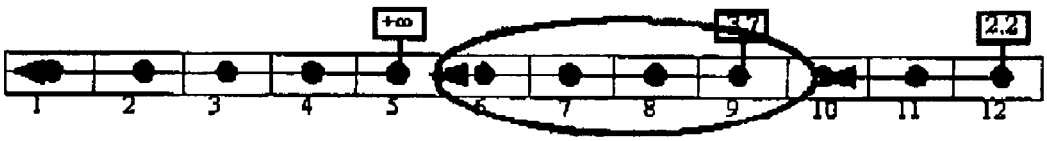

The ray-tracing step outlined above can be made significantly more efficient when the rays are aligned such that they are coincident with multiple voxel centers. This allows for a significant reduction in the computations required because the result of a single ray cast can be used to determine the votes for a number of voxel centers at once. It is also possible to scan both directions of a line of voxels at one, for an additional performance gain. FIG. 6 diagrams the process of optimized ray casting.

---

Pseudocode listing: ray marching with vote casting logic

```
if(s = +1) u_begin = u_a, u_end = u_B
if(s = -1) u_begin = u_B, u_end = u_a
Δu = u_end - u_begin
u_step = (sgn(Δu_x),sgn(Δu_y),sgn(Δu_z))
d_step = √(Δc·u_stepx)² + (Δc·u_stepy)² + (Δc·u_stepz)²
u_current = u_begin
cast ray in (u_end - u_begin) direction from u_current thus determining
a distance to hit, d_hit, as well as the sign of the ray-face normal
dot product S_hit
while {(d_hit > 0) {
    register_vote(u_current, d_hit, s_hit)
        u_current + = u_step
        d_hit - = d_step
}
```

---

Votes are recorded into a set of fields. Three integral fields: one to record negative votes, the "outside count" field, ψ[outside], one to record positive votes, the "inside count" field, ψ[inside], and another to record the zero votes, the "surface count" field, ψ[surface]. A fourth scalar field is also needed, the "absolute minimum distance" field.

The "inside count", "surface count" and "outside count" fields are initialized at the beginning of the conversion process to zero, while the "absolute minimum distance" field is initialized to positive infinity.

```
pseudocode listing: vote recording logic register_vote( u, d, s ) {
    //record the sign
    if(s = 0)  →ψ_u^surface += 1
    if(s = -1) →ψ_u^outside += 1
    if(s = +1) →ψ_u^inside += 1
    //update absolute minimum distance if necessary
    δ_u = MIN(δ_u,d)
}
```

Vote Analysis and Preliminary Level Set Creation

A preliminary level set is constructed from the votes recorded during the ray casting step. For each voxel center of the desired level set, the scalar field function's magnitude and sign are calculated separately. The scalar field function result's magnitude is set to the minimum absolute distance of the "distance votes" associated with the particular voxel. The sign of the scalar field function result is set to the winning sign as determined by counting of the "sign votes" associated with the voxel. If there is a tie between the positive and the negative votes after counting the "sign votes" the choice of winner is application dependent. In our applications of the invention we found that is was desirable for the "positive" sign to win in the case of a tie.

If one were to use the vote tables as specified in section 3.3.2.1 the following pseudocode would be effective in constructing the preliminary level set on a voxel-by-voxel basis:

```
pseudocode listing: vote tabulation logic if (ψ_u^surface > 0) { φ_u = 0 }
else {
    //favor inside if there is a tie
    int sgn = [ψ_u^outside > ψ_u^inside] ? +1 : -1
    φ_u = sgn · δ_u
}
```

Step 4: Zero-Level Set Discontinuity Fix

Figure 7:
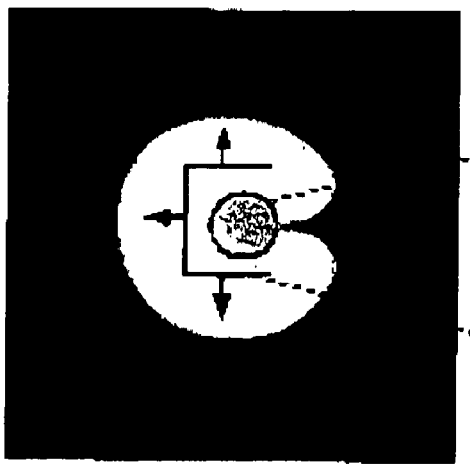
FIG. 7 is an example of a discontinuity adjacent to the zero-level set in a preliminary level set.

In some situations the preliminary level set generated after analyzing the votes contains some discontinuities—regions in which the gradient of the level set is much larger than the desired magnitude of one. Discontinuities that are not directly adjacent to the zero-level set can be fixed via the "reinitialization"/"smoothing" process. Discontinuities directly adjacent to the zero-level set can be fixed by examining each pair of adjacent voxels. If the pair differ in sign (i.e. both are directly adjacent to the zero-level set) and the difference between their respective scalar field function values is significantly larger than the distance in space between the voxel centers, the values should be reset to values that do differ by only the distance between the voxel centers but that do not modify the location of the zero-level set intercept between them. An example of the zero-level set discontinuity can be seen in FIG. 7.

Step 5: Final Level Set Smoothing

The preliminary level set, from which the zero-level set adjacent discontinuities where removed, is then processed by a level-set reinitialiation, or smoothing method. Many such methods are detailed from the level set methods literature. These methods in general process the values of the level set such that the gradient away from the zero-level set is approximately 1. One method used extensively is based on solving to a steady state in fictitious time the following PDE:

$$\phi_\eta = -S(\phi^{\eta=0})(|\nabla\phi| - 1)$$

$$S(\phi) = \frac{\phi}{\sqrt{\phi^2 + \Delta\tau^2}}$$

This is discussed in detail by (Osher, S. & Fedkiw R. 2003).

Mesh to RLE Sparse Level Set

Instead of representing the implicit surface with a dense level set, a sparse representation can be used. The level set data is encoded into a structure using run-length encoding to reduce the physical space requirements to O(nlog r) where r is the number of runs in the data set. The process of converting a mesh to the RLE sparse level set is similar to the dense field, with the following changes.

The input to this process remains the same as in the conversion to the dense level set. The output is a series of runs of either compressed values, or single data values. Uncompressed values are defined around the interface of the zero level set at an arbitrary distance, and compressed values represent the distance field outside of the interface.

Run Length Encoded Sparse Level Set

The generic representation of a volumetric region as composed of a series of runs of both varying values and constant that can be accessed randomly with O(log r) efficiency and linearly with O(1) is termed the RLE sparse level set representation.

Run length encoding (RLE) is a method for compressing a sequence of data in a lossless way. Runs of identical values are compressed into a single value to reduce the storage requirements. A marker is added to indicate the length of the run. RLE is used in this procedure to encode the signed distance data. Runs of +∞ and −∞ are compressed, as they occur often in the signed distance data set, but other values can be chosen.

The RLE sparse level set representation is different from most of the other scalable signed distance field representations in that it doesn't represent or approximate the distance field outside of the defined narrow interface band. For some methods, such as performing arbitrarily large surface offsets, this is a limitation but in the context of the applications described there are significant benefits. The largest benefit, and an important difference to note, is that the common but very restrictive convention of having a maximal bounding volume can be discarded in favor of a dynamic minimal narrow band bounding volume. The discarding of the maximal bounding volume also presents some issues in regards to voxel coordinate systems used to reference voxels.

The RLE sparse field structure is composed of 6 distinct elements: an axis of compression, a local bounding volume, an AB-offset table, a C-run start index array, a C-run data offset array and a count of the explicitly defined voxel values. The axis of compression defines the axis along which the runs are aligned this axis is now referred to as axis C, the other two axes are referred to as A and B. The local bounding volume provides the maximal extent of the RLE sparse region in the voxel coordinate space. The AB-offset table stores at each location the index of the first run associated the corresponding A-B line cross-section of the local bounding volume.

The C-run start index array records in sequential order the C-axis voxel coordinate at the start of each run. The C-run data offset array mirrors the C-run start index array except that stored is either the positive offset into the (as yet not described) data array (which isn't part of the RLE sparse field representation) if the C-run is varying or a negative run type token if the C-run is not varying. The count of explicitly defined voxel values is simply stored for convenience sake.

To define a complete RLE sparse scalar field, pair an appropriately defined RLE sparse field structure with a data array of the appropriate data type (scalar in the level sets) array that can hold the values of the total defined voxels. It is not difficult to concurrently define a RLE sparse field structure while compiling the appropriate flat array of defined voxel values.

Mesh to Sparse Level Set Conversion Procedure

The process for converting a mesh into a sparse level set is similar to the way that the dense level set is created. The step of ray casting is augmented to handle the sparse representation.

Figure 8:
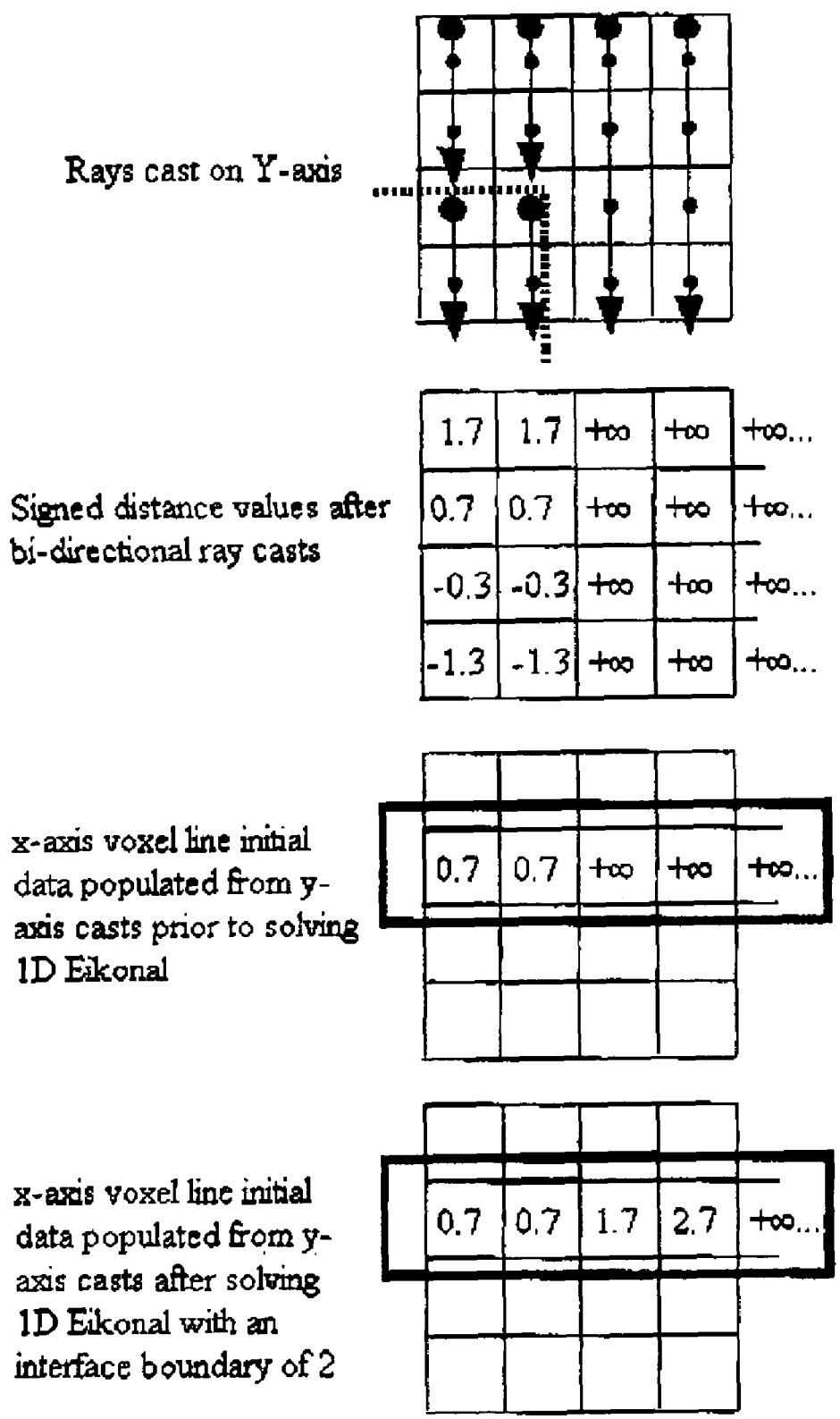
FIG. 8 is a ray casting and RLE encoding for a RLE sparse level set.

The ray casting procedure is modified in the following ways. Rays are cast as before along each axis. The data is encoded in RLE format as detailed in FIG. 8 with the runs explicitly defined.

When the ray casting starts along the second and third axis (and optional diagonals), the data in each voxel line is extracted from the RLE form from the rays previously cast in a different direction. A one dimension Eikonal equation is solved to estimate the distance values along the current voxel line, within the predefined interface boundaries. This is performed so that when the RLE compression is done to convert the data into runs of defined values and undefined values, there is an accurately sized interface boundary defined. An example of the modification to the ray casting for a sparse level set is presented in FIG. 8.

Preparing the Sparse Level Set by Out of Order Traversal

Before improving the approximation of each line cross-section of the bounding volume by solving the 1 dimension Eikonal equation, it is necessary to populate this line cross-section from the previous approximation of the whole level set. This procedure is complicated because the axis along which the previous approximate level set was compressed will not match the axis along which the current line cross-section runs—this is because each of the encoding scans is done along a different axis.

The naive approach to decoding and populating this line segment is simply to use random accesses. This incurs a cost of $O(n \log r)$ for each line segment of length n, assuming there are average r runs in each line-cross section. Since in a cubical bounding volume of width n there are $n^2$ line cross sections this decoding and populating step will in total require $O(n^2 (n \log r))$ or $O(n^3 \log r)$ computations.

In-order traversal of an RLE sparse level set though incurs only O(1) cost per element decoded. It is possible to view the out of order traversal needed to decode and populate the line cross-sections as simply $n^2$ concurrent in-order traversals. The in-order traversals are perpendicular to the axis along which the current line cross-section lies. The storage cost for the many concurrent in-order traversals is $O(n^2)$ which does not have a significant impact on the overall efficiency. Incurring a cost of O(1) for each element decoded still results in the unnecessarily high total cost of $O(n^3)$ when traversing the whole level set.

One method to improve efficiency even further is via representing the line cross-section not as a flat array but rather as a RLE sparse line encoding. This reduces the need to process all the voxels in a line cross-section—a cost that so far has not been discussed in detail—and it also opens the possibility of a more efficient out of order traversal method inspired by methods already existent in the field of computational geometry. In order to reduce the need to do an in-order traversal of each perpendicular line segment corresponding to a voxel in the current line segment is it necessary to operate on the perpendicular run structure efficiently. This can be accomplished by adding all the current perpendicular runs to a priority queue which orders them by the location on their axis of compression at which the runs terminate. The RLE sparse line encoding can be efficiently updated each time it is moved further down the previous axis of compression by querying the priority queue if there are any runs that change at this location. If there are runs which change their type then these runs sorted so that one can linearly traverse the previous RLE sparse line encoding and encode the new RLE sparse line encoding by examining the runs which are changing.

This new process requires n priority queues of length n for the complete out of order traversal in addition to n RLE sparse line encodings. During the traversal there will be n re-encodings each of the n RLE sparse lines of which each incurs $O(r+d+r \log r)$ cost thus incurring a total cost of $O(n^2 (r+d+r \log r))$. Each run in the previous approximation of the level set will be insert and removed from one of the priority queues and assuming each $O(\log n)$ insertion and $O(\log n)$ removal the cost of these operations will be $O(n (n r \log n))$ or $O(n^2 r \log n)$. Combining all total costs together the result is a total cost on the order of $O(n^2 r (\log n + \log r))$—which in cases where n is large and r is relatively small (which in most RLE sparse level sets is true) is significantly more efficient that $O(n^3)$.

REFERENCES

ADALSTEINSSON, D., AND SETHIAN, J., 1995. A fast level set method for propagating interfaces.

BETELU, S., TANNENBAUM, A., AND SAPIRO, G. 2001. A method for denoising textured surfaces. *Institute for Mathematics and Its Applications Pre-Print Senes* (April).

BREEN, D. E., MAUCH, S., AND WHITAKER, R. T. 1998. 3D scan conversion of CSG models into distance volumes. In *IEEE Symposium on Volume Visualization*, 7–14.

BRIDSON, R. 2003. *Computational aspects of dynamic surfaces.* PhD thesis, Stanford University.

CURLESS, B., AND LEVOY, M. 1996. A volumetric method for building complex models from range images. *Computer Graphics* 30, Annual Conference Series, 303–312.

ENRIGHT, D., & FEDKIW, R. (2002) Animation and Rendering of Complex Water Surfaces, SIGGRAPH 2002 Proceedings.

ENRIGHT, D., MARSCHNER, S., AND FEDKIW, R. 2002. Animation and rendering of complex water surfaces. In *Proceedings of SIGGRAPH* 2002, ACM Press/ACM SIGGRAPH, Computer Graphics Proceedings, Annual Conference Series, ACM, 736–744, ENRIGHT, D., LOSASSO, F., AND FEDKIW, R. 2004. A fast and accurate semi-lagrangian particle level set method. in review.

FOSTER, N., AND FEDKIW, R, 2001. Practical animation of liquids. In *Proceedings of ACM SIGGRAPH* 2001, ACM Press/ACM SIGGRAPH, Computer Graphics Proceedings, Annual Conference Series, 23–30.

FRISKEN, S. F., PERRY, R. N., ROCKWOOD, A. P., AND JONES, T. R. 2000. Adaptively sampled distance fields: A general representation of shape for computer graphics, In *Siggraph* 2000, *Computer Graphics Proceedings*, ACMPress/ACM SIGGRAPH/Addison Wesley Longman, K. Akeley, Ed., 249–254.

GUENDELMAN, E., BRIDSON, R., AND FEDKIW, R. 2003, Nonconvex rigid bodies with stacking. *ACM Trans. Graph.* 22, 3, 871–878.

JIANG, G.-S., AND PENG, D. 1999. Weighted eno schemes for hamilton-jacobi equations. *SIAM J. Sci. Comput.* 21, 6, 2126–2143.

MAUCH, S. 2000. A fast algorithm for computing the closest point and distance transform. http://www.acm.caltech.edu/seanm/software/cpt/cpt.pdf.

MORTENSON, M. E. (1999) Mathematics for computer graphics applications: an introduction. Industrial Press: New York.

OSHER, S., & FEDKIW, R. (2003) Level set methods and dynamic implicit surfaces. Spinger: New York.

OSHER, S., AND SETHIAN, J. A. 1988. Fronts propagating with curvature-dependent speed: Algorithms based on Hamilton- Jacobi formulations. *Journal of Computational Physics* 79, 12–49.

PAYNE, AND TOGA. 1992. Distance field manipulations of surface models. *Computer Graphics and Applications* 12, 1, 65–71. SETHIAN, J. 1996. Fast marching level set method for three dimensional photolithography development. *Proc SPIE International Symposium on Microlithography* (March).

PENG, D., ET AL (1999) A PDE Based Fast Local Level Set Method

SETHIAN, J. A. "Level Set Methods and Fast Marching Methods", Cambridge University Pres, Cambridge, 1999.

TSAI, Y., CHENG, L., OSHER, S., AND ZHAO, H. 2003. Fast sweeping algorithms for a class of hamilton-jacobi equations. *SIAM Journal on Numerical Analysis* 41, 2, 673–694.

YNGVE, G., AND TURK, G. 2002. Robust creation of implicit surfaces from polygonal meshes. *IEEE Transactions on Visualization and Computer Graphics* 8, 4, 346–359.

WATT, A., & WATT, M. (1996) "Advanced Animation and Rendering Techniques", ACM Press: New York.

While one embodiment of the present invention has been described in the for going, it is to be understood that other embodiments are possible within the scope of the invention. The invention is to be considered limited solely by the scope of the appended claims.

Unless defined otherwise, all technical and scientific terms used herein have the same meaning as commonly understood by one of ordinary skill in the art to which the invention belongs. Although any methods similar or equivalent to those described herein can be used in the practice of the present invention, the preferred methods and materials are described herein. All documents and publications mentioned in the foregoing are incorporated herein by reference.

The invention claimed is:

1. A method of converting an explicit definition of a geometric object located in a prescribed space to a level set which implicitly defines said geometric object, the method comprising:

dividing the prescribed space into a grid of voxels, each voxel comprising a unit of the prescribed space;

casting rays in plural directions to obtain plural distance votes associated with each voxel in which each distance vote represents a distance from the voxel, through the prescribed space, to the geometric object in one of said plural directions of the rays;

assigning a magnitude value to each voxel by selecting the distance vote associated with that voxel which is lowest in magnitude;

determining if each voxel is either inside or outside of the geometric object in the prescribed space; and assigning a sign value to each voxel, the sign value being either a positive sign or a negative sign in which each of the signs is representative of a sign condition of the voxel being either inside or outside of the geometric object.

2. The method according to claim 1 wherein determining if each voxel is either inside or outside of the geometric object includes associating a sign vote with each distance vote associated with the voxel in which each sign vote is either a positive sign or a negative sign representative of the sign condition as determined by casting the rays, and wherein the sign value is assigned a sign which is a majority sign of the sign votes associated with that voxel.

3. The method according to claim 2 wherein the explicit definition of the object includes normal vectors defined which project in a perpendicularly outward direction from a surface of the object, the method including determining the sign votes representing the voxel being either inside or outside of the object by comparison to the normal vectors of the surface of the object.

4. The method according to claim 2 including either consistently assigning a positive sign or consistently assigning a negative sign to the sign value when sign votes of positive sign and sign votes of negative sign for a given voxel are equal in number.

5. The method according to claim 1 including casting rays along at least three axes of each voxel which are lying transversely to one another.

6. The method according to claim 1 including casting rays along axes of the grid of the voxels.

7. The method according to claim 1 including casting rays in directions which intersect a plurality of voxels.

8. The method according to claim 7 including interpolating distance votes of voxels between a selected voxel having a distance vote which has already been assigned and the object along an axis of the ray which was cast for assigning the distance vote to said selected voxel.

9. The method according to claim 7 including interpolating distance votes of voxels between a selected voxel having a distance vote which has already been assigned and the object in a first direction along an axis of the ray which was cast for assigning the distance vote to said selected voxel and subsequently interpolating distance votes in a second direction along said axis by casting rays in an opposite direction.

10. The method according to claim 1 including comparing the magnitude values of adjacent voxels adjacent to the implicitly defined object in the grid of voxels and adjusting the magnitude values such that adjacent ones of the magnitude values differ by approximately a magnitude of a dimension of the voxels and such that a surface of the implicitly defined object remains in a same position with the grid of voxels.

11. The method according to claim 1 including applying a level set re-initialization algorithm to the voxel magnitude values which implicitly define the geometric object.

12. The method according to claim 1 including defining a bounding box in the prescribed space which contains the object; casting rays only from voxels which are contained within the bounding box.

13. The method according to claim 1 including defining a bounding box in the prescribed space which intersect the object and clipping the explicit definition of the object against the bounding box of the domain of the implicitly defined object.

14. The method according to claim 1 wherein the explicit definition of the geometric object is a polygonal mesh.

15. The method according to claim 1 wherein the explicit definition of the geometric object is a NURBS surface.

16. The method according to claim 1 wherein the explicit definition of the geometric object is a subdivision surface.

17. The method according to claim 1 including generating a representation of the explicit definition of the geometric object which allows for efficient ray casting prior to casting the rays.

18. The method according to claim 1 including applying run length encoding to define a sparse level set in which consecutive voxels having identical values are compressed into a single value including a marker to indicate a quantity of the consecutive voxels.

19. The method according to claim 18 including casting rays along a first axis using the run length encoding with the runs explicitly defined, and subsequently casting rays along second and third axes transverse to the first axis in which the values of the voxels are extracted from the run length encoding from the rays previously cast along a different one of the axes.

20. The method according to claim 19 wherein the values of the voxels are extracted from the run length encoding from the rays previously cast using a one dimension Eikonal equation solved to estimate the magnitude values within predefined interface boundaries.

21. The method according to claim 18 in which extra data structures are created and a different method using out-of-order traversal of the run length encoded signed distance data is performed to initialize the level set data in preparation for ray casting along a new axis by:
    performing $n^2$ concurrent in-order traversals perpendicular to the axis along which a current line cross-section lies;
    encoding the line cross-section using an additional run length encoded sparse line encoding by adding all the current perpendicular runs to a priority queue which orders them by the location on their axis of compression at which the runs terminate;
    querying a priority queue to find out if there are any runs that change at this location in the previous axis of compression; and
    sorting runs if said runs change their type from containing uncompressed data to compressed data so that one can linearly traverse the previous run length encoded sparse line encoding and encode the new run length encoded sparse line encoding by examining the runs which are changing.

* * * * *